US008468339B2

(12) United States Patent
Parkinson et al.

(10) Patent No.: US 8,468,339 B2
(45) Date of Patent: Jun. 18, 2013

(54) EFFICIENT SECURITY INFORMATION DISTRIBUTION

(75) Inventors: Steven W. Parkinson, Mountain View, CA (US); Robert B. Crittenden, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1409 days.

(21) Appl. No.: 11/607,563

(22) Filed: Nov. 30, 2006

(65) Prior Publication Data

US 2008/0133906 A1 Jun. 5, 2008

(51) Int. Cl.
*H04L 29/06* (2006.01)
(52) U.S. Cl.
USPC ........... 713/156; 713/157; 713/158; 713/168; 380/30
(58) Field of Classification Search
USPC .......................................... 713/156
See application file for complete search history.

(56) References Cited

U.S. PATENT DOCUMENTS

| | | | | |
|---|---|---|---|---|
| 5,699,431 | A * | 12/1997 | Van Oorschot et al. | 380/30 |
| 5,864,852 | A | 1/1999 | Luotonen | |
| 6,397,329 | B1 | 5/2002 | Aiello et al. | |
| 6,487,658 | B1 | 11/2002 | Micali | |
| 6,748,447 | B1 * | 6/2004 | Basani et al. | 709/244 |
| 6,766,450 | B2 | 7/2004 | Micali | |
| 7,337,315 | B2 * | 2/2008 | Micali | 713/157 |
| 7,500,100 | B1 * | 3/2009 | Kobozev et al. | 713/168 |
| 7,526,644 | B2 * | 4/2009 | Kocher | 713/158 |
| 2002/0104000 | A1 * | 8/2002 | Kang et al. | 713/158 |
| 2003/0220946 | A1 | 11/2003 | Malik | |
| 2004/0064693 | A1 * | 4/2004 | Pabla et al. | 713/168 |
| 2004/0111607 | A1 * | 6/2004 | Yellepeddy | 713/155 |
| 2005/0154879 | A1 | 7/2005 | Engberg et al. | |
| 2005/0193204 | A1 | 9/2005 | Engberg et al. | |
| 2006/0143136 | A1 | 6/2006 | Low et al. | |
| 2006/0288224 | A1 | 12/2006 | Won et al. | |
| 2007/0067332 | A1 * | 3/2007 | Gallagher et al. | 707/102 |
| 2007/0260589 | A1 | 11/2007 | Yugami | |
| 2007/0294526 | A1 * | 12/2007 | Medvinsky et al. | 713/158 |

OTHER PUBLICATIONS

Ying, Gao, and Zhan Jiang. "Research on CRL Distribution in P2P Systems." Computer Science and Information Technology, 2009. ICCSIT 2009. $2^{nd}$ IEEE International Conference on Computing and Processing (Hardware/Software). [2009]: pp. 574-577.*
Red Hat, Inc. Office Action for U.S. Appl. No. 11/607,215 mailed Dec. 3, 2009.
Myers, M., "Networking Group," PKIX, RFC 2560, Category: Standards Track, Jun. 1999, pp. 1-23.
Red Hat Notice of Allowance for U.S. Appl. No. 11/607,215 mailed Jun. 2, 2010.

* cited by examiner

*Primary Examiner* — Taghi Arani
*Assistant Examiner* — Narciso Victoria
(74) *Attorney, Agent, or Firm* — Lowenstein Sandler LLP

(57) ABSTRACT

Methods and software for distributing several data objects containing status information about security certificates, and a directory of the data objects, through a peer-to-peer data distribution network. Other methods and software for preparing a certificate status object containing validity information about a security certificate, and a reaffirmation object identifying the certificate status object, both to be transmitted to a requesting client after an expiration time contained in the certificate status object.

21 Claims, 7 Drawing Sheets

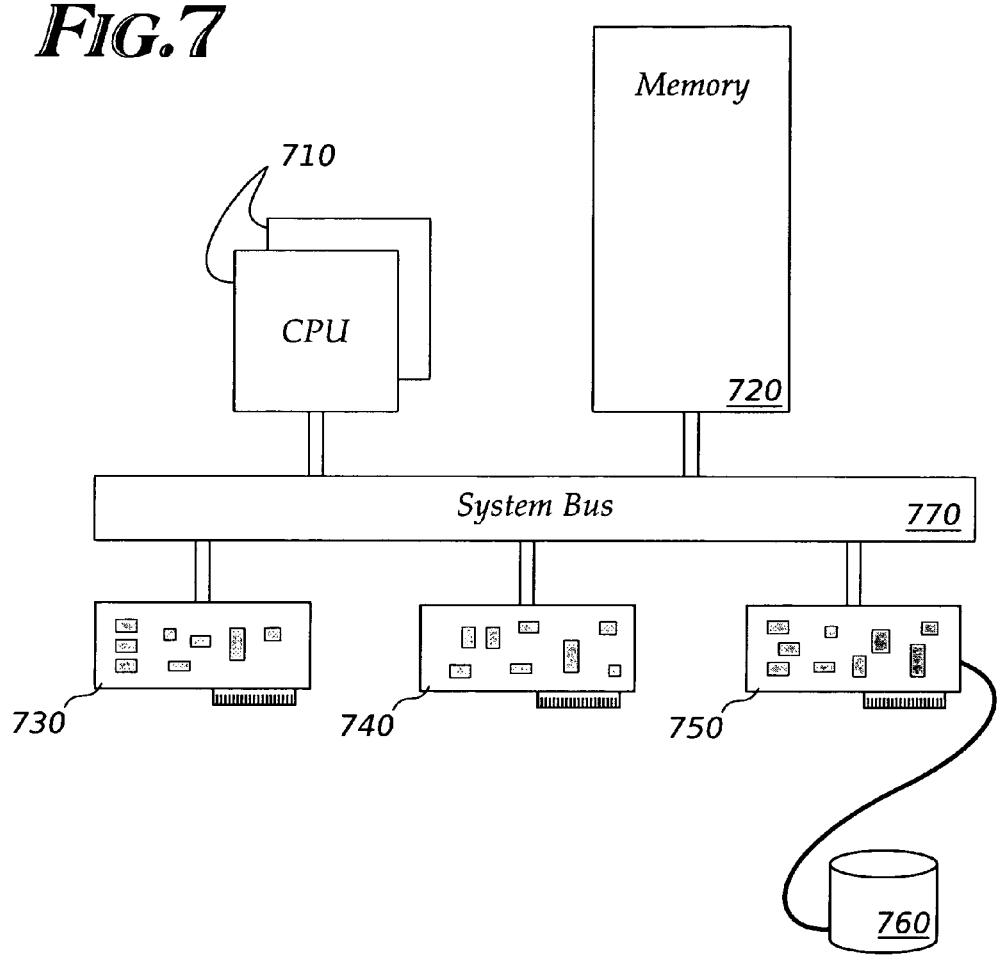

EFFICIENT SECURITY INFORMATION DISTRIBUTION

The invention relates to computer security. More particularly, the invention concerns efficient distribution of information used in some computer security environments.

BACKGROUND

A Public Key Infrastructure ("PKI") is a set of protocols and conventions to facilitate secure and verifiable electronic communications between parties who may lack a safe channel or prior acquaintance history that they could use to verify each other's identity. The basic elements of PKI are pairs of keys, denoted "public" and "private," with the property that a message encrypted with the public key can only be decrypted with the corresponding private key (and vice versa). A user with such a pair of keys can publish one (the "public" key) and encrypt his messages with the other (the "private" key); recipients of the messages can decrypt the messages with the public key and receive some assurance that the sender of the message knew the corresponding private key. The encryption with the private key functions as a cryptographic signature. In one common usage, a sender computes a cryptographic hash of a message and encrypts the hash with his private key. The message itself may be transmitted in plaintext with the encrypted hash appended. A recipient can decrypt the encrypted hash with the sender's public key and compare it with a hash of the message he computes himself to verify that the message was not altered and that the sender knew the corresponding private key.

The simple use of public and private keys described above is vulnerable to attack unless the message recipient has some way of associating the public key with the message sender. A Public Key Infrastructure addresses this problem by introducing a trusted third party called a Certificate Authority ("CA"). A CA has its own public and private keys, and performs the service of verifying the identity of a party who is associated with a public/private key pair. The CA produces a certificate containing the party's public key and identity information. The certificate is signed with the CA's private key, and can be verified with the CA's public key. Of course, the recipient must still have some way of establishing that the CA's public key belongs to the CA (and not to an impostor), but once this is established, messages from any sender who produces a certificate signed by the CA can be verified. The recipient need no longer verify each sender's public key individually. This fact makes it efficient and economical to go to the trouble of verifying the CA's keys, since this single verification automatically permits verification of messages from any user who has a certificate from the CA.

A Public Key Infrastructure may also define a mechanism for a CA to notify users of revoked certificates. For example, if a sender's private key is compromised by an attacker, the sender will want to disavow all messages signed by the private key after the compromise, and recipients will want to confirm the continued validity of sender certificates of messages they receive. This, too, can be accomplished with the assistance of the trusted CA. The CA publishes a list of revoked certificates (a certificate revocation list or "CRL") containing identifiers of certificates that are no longer to be trusted. The CRL is signed by the CA to prevent attacks where arbitrary (uncompromised) certificates are announced as revoked.

Since a CA may issue tens or hundreds of millions of certificates, CRLs can be quite lengthy. Alternate one-at-a-time certificate validity checking protocols such as the Online Certificate Status Protocol ("OCSP," described in Internet Engineering Task Force ("IETF") Request for Comments ("RFC") document number 2560, published June 1999) permit individual certificates (or small numbers of certificates) to be validated, but the computational cost of signing each OCSP response can become overwhelming and eliminate any savings over distributing the whole CRL. New, efficient methods of distributing information about valid and revoked certificates may be of value in this field.

DEFINITIONS

Many operations and aspects of embodiments of the invention use hash values. A hash value (or simply a "hash") is a number computed from an arbitrary sequence of input data bytes, with at least the property that a second computation from an identical sequence of input data bytes yields the same hash. A checksum (the sum of all input data bytes modulo a maximum value of the checksum) is a simple hash. Hash values are usually relatively short (for example, 64-512 bits) and may be useful to detect corruption or tampering when a longer sequence of data bytes is transmitted.

A "hash collision" occurs when two different sequences of input data bytes produce identical hash values. Since hashes can be computed over an infinite universe of input data byte sequences, collisions are inevitable between hashes of finite length. However, many useful hash functions are "cryptographically secure:" it is computationally infeasible to find a second sequence of bytes that produces the same hash value as a first sequence. Consequently, a cryptographically secure hash provides good protection against data corruption and malicious tampering.

Message Digest algorithm 5 ("MD5"), designed by cryptographer Dr. Ronald Rivest in 1994, and the Secure Hash Algorithm ("SHA") family of hash functions, designed by the United States National Security Agency, are commonly-used hashes with favorable properties such as computational efficiency and cryptographic security.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

FIG. 7 is a block diagram showing several components of a computer system that participates in a system that uses an embodiment of the invention.

DETAILED DESCRIPTION

Figure 1:
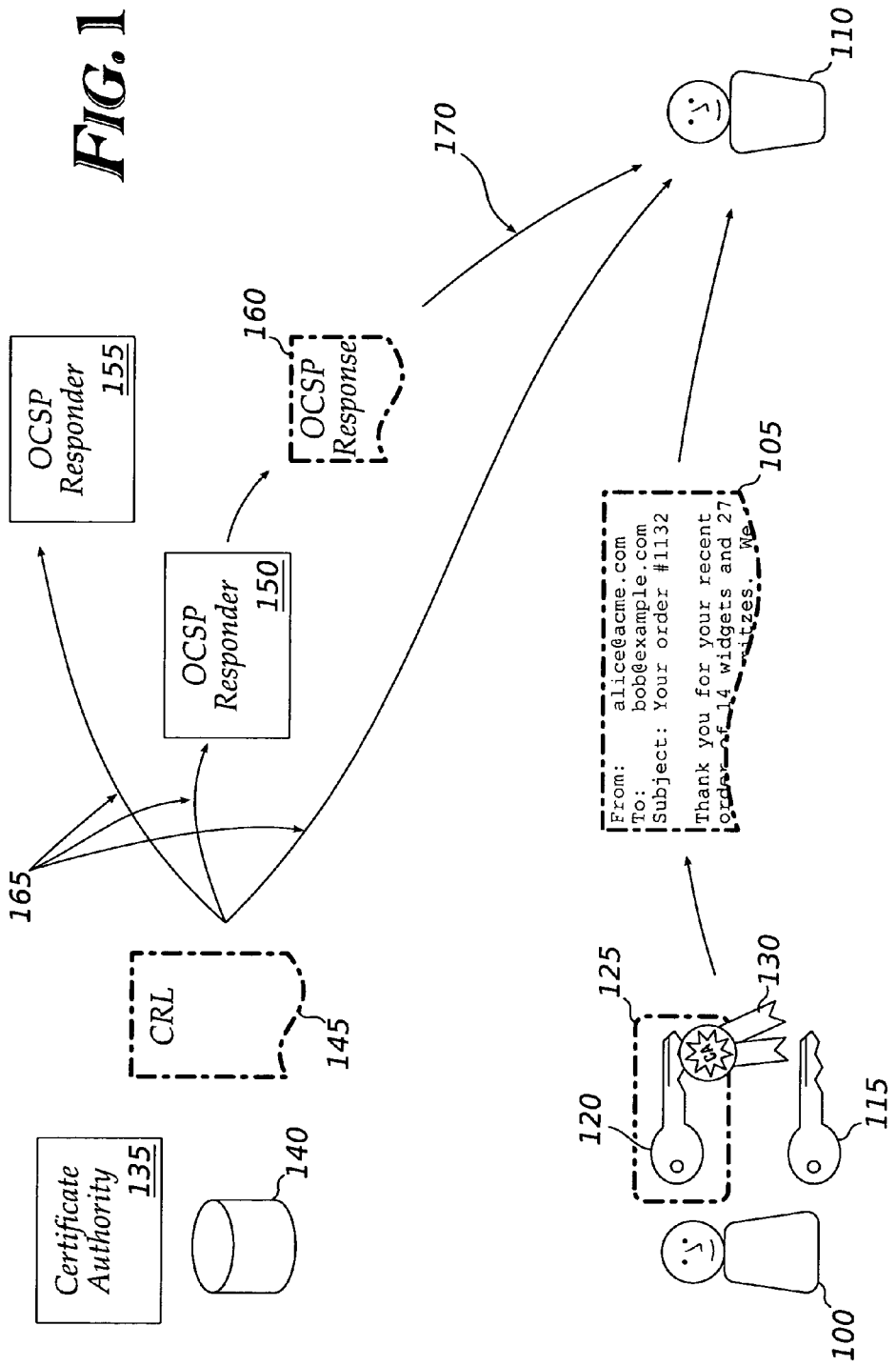
FIG. 1 shows an environment where an embodiment of the invention can be applied to improve the efficiency of security information distribution.

FIG. 1 shows an environment where embodiments of the invention can be used. A first user, Alice 100, sends an electronic mail message 105 to a second user, Bob 110. Alice 100 has signed message 105 with her private key 115; she also has the corresponding public key 120. Alice has established her identity to the satisfaction of Certificate Authority ("CA") 135, so her public key 120 carries a signature from CA 135 (as indicated by the medallion 130 in this Figure). A data structure containing a public key and a signature from a trusted entity such as Certificate Authority is called a certificate 125. Certificate Authority 135 maintains a database 140 of all the certificates it has issued.

User Bob 110 wishes to verify that message 105 came from Alice 100, so he first acquires a copy of Alice's public key 120 (typically by obtaining her certificate 125). The certificate may come from Alice herself, from Certificate Authority 135, or from another Public Key Infrastructure ("PKI") server (not shown). After validating the signature of CA 130 on the public key 120, Bob 110 can use the key to check the signature on message 105 to confirm that it was signed with Alice's private key 115.

Finally, Bob 110 should investigate whether Alice's certificate 125 is still valid. In this PKI, the ultimate source of such validity information is the issuing Certificate Authority 135. CA 135 periodically distributes a list of revoked certificates (Certificate Revocation List or "CRL" 145), to which Bob 110 may refer. However, CRL 145 may be large and costly to download, and may contain information about many revoked certificates of no interest to Bob. Bob 110 can also query an Online Certificate Status Protocol ("OCSP") responder 150 or 155. OCSP Responders 150 and 155 obtain the full CRL 145 and respond to queries about individual certificates, producing OCSP responses 160. If Bob 110 determines that message 105 was signed with private key 115, and that certificate 125 is still valid, he can proceed on the assumption that message 105 really came from Alice 100.

Embodiments of the invention can improve the processes involved in furnishing CRL data 145 from CA 135 to an end user 110 (perhaps through an intermediary such as OCSP Responder 150 or 155), as explained below. More specifically, the transmission of CRL data and similar certificate status data from CA 135 to an OCSP Responder 150, 155 or an end user 110, as shown by the arrows identified as element 165 can be improved. Also, the transmission of OCSP responses 160 from an OCSP Responder 150 to an end user 110 (as shown by the arrow identified as 170) can be improved.

Note that in FIG. 1, several data objects are drawn with heavy, dot/dashed lines. These lines indicate a data structure secured with a cryptographic signature. For example, public key/certificate 125 and CRL 145 are signed with a private key (not shown) of CA 135. Message 105 is signed with Alice's private key 115. OCSP response 160 is signed with a private key (not shown) of OCSP responder 150. Other Figures will use this same notation: a heavy dot/dashed line around a data structure indicates that the data structure is secured with a cryptographic signature. Fragments of a signed data structure may contain comprehensible data (i.e. the data may not be encrypted) but the signature on the data structure generally cannot be validated until the complete data structure is available. Use of portions of a signed data structure before the signature is validated is insecure.

Although it is not shown in FIG. 1, Alice 100 may also use an embodiment of the invention to validate a public key and certificate of Bob 110. For example, if Alice 100 wishes to encrypt message 105 so that only Bob 110 can read it (in addition to signing it so that Bob can confirm that the message came from Alice 100) then she should validate Bob's public key and certificate to avoid encrypting the message with a public key that has been compromised or revoked for other reasons.

One way of reducing the burden on CA 135 of distributing large CRIs is to spread the distribution work across a peer-to-peer network similar to BitTorrent. The CA sends pieces of the signed CRL file to various clients, but the clients can exchange pieces among themselves so that each can collect all the data of the CRL without receiving every piece directly from the CA. Since the CRL is signed, each client can confirm that the CRL pieces have not been modified by a malicious participant in the peer-to-peer network. Unfortunately, as mentioned earlier, a signed data structure generally cannot be validated until the complete data structure is available. Therefore, although the peer-to-peer distribution approach can reduce the load on the CA, each client must still obtain the entire (often large) CRL before any certificate revocation information therein can be used.

Figure 2:
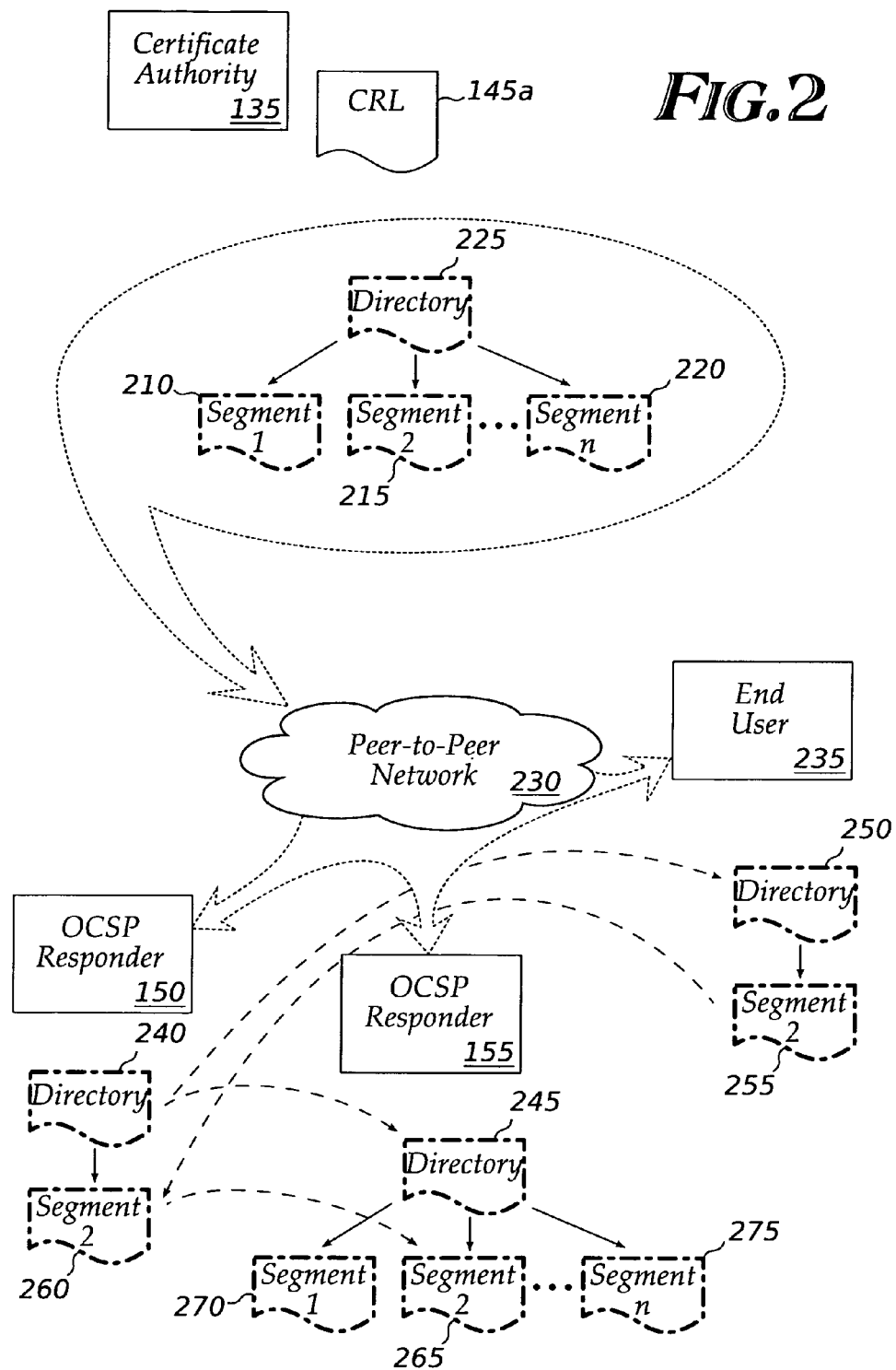
FIG. 2 is a block diagram showing data objects and information flows among participants in a system.

An embodiment of the invention can improve on this situation as shown in FIG. 2. Certificate authority 135 takes CRL data 145*a* (the data need not be cryptographically signed at this point) and partitions it into a plurality of segments 210, 215, 220. Each segment may be individually cryptographically signed, as shown. Segments contain status information about one or more certificates. Some embodiments place only information about revoked certificates in the segments (i.e. the segments together contain approximately the same information as the full CRL 145*a*). Other embodiments may include information about valid certificates in some of the segments, along with information about revoked certificates.

A signed directory 225 that identifies which segments contain status information about which certificates is prepared. The segments 210, 215, 220 and directory 225 are made available to participants in a peer-to-peer network 230. Participants such as OCSP Responders 150 and 155, and end user 235, can obtain the directory and segments from CA 135. However, they can also exchange the directory and segments among themselves. For example, OCSP Responder 150 may obtain a copy 240 of directory 225 from CA 135, and redistribute copies 245, 250 of the directory to its peers, OCSP Responder 155 and end user 235. Similarly, end user 235 may obtain a copy 255 of Segment 2 215 from CA 135, and provide a copy 260 to OCSP responder 150, which may further distribute the segment to OCSP responder 155 as Segment 2 copy 265. OCSP Responder 155 may be unable to obtain other segments from its peers (e.g. because no peer has yet downloaded a copy) so it may retrieve segment copies 270, 275 directly from CA 135.

Note that because directory 225, and in some embodiments, segments 210, 215 and 220, are cryptographically signed by CA 135, participants in the peer-to-peer network 230 can verify that each data structure is authentic, even if the participants do not trust each other. If any participant attempts to subvert the distribution of security information by altering certificate status information in a segment (for example, by marking a valid certificate as revoked, or by marking a revoked certificate as valid), other peers will be able to detect the modifications and disregard the modified data.

Figure 3:
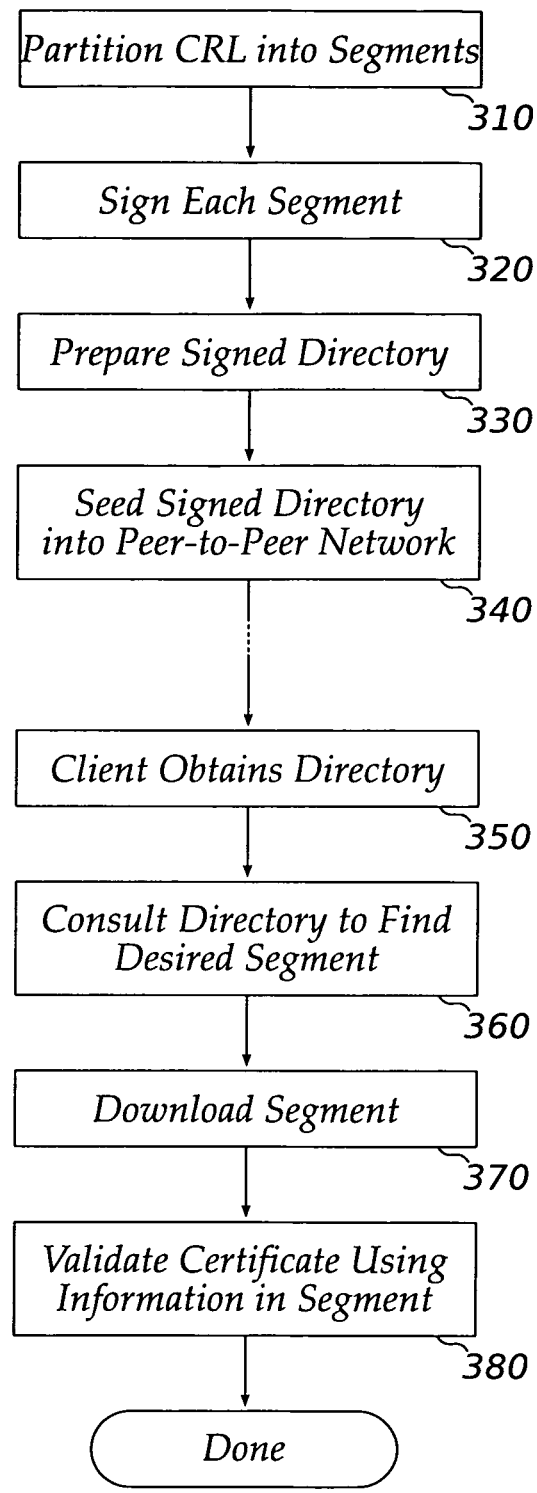
FIG. 3 is a flow chart outlining a method according to an embodiment of the invention.

FIG. 3 presents a method-oriented explanation of the CRL- and related-security information distribution process. First, a CRL is partitioned into segments (310). Each segment is a data object containing one or more records identifying revoked certificates. Also, although a conventional CRL only contains revoked-certificate information, in some embodiments, segments may contain records identifying valid certificates as well. There may be some overlap between certificate identifiers in different segments, although all segments should agree on the status (valid or revoked) of any repeated certificates.

Segments may be individually signed with a private key of the CA (320) so that the records in a segment can be validated and used as soon as the segment is received. (An alternate embodiment where individual segments need not be individually signed is presented below.) A signed directory that identifies which segment(s) contain information about which certificates is prepared (330). For example, if certificates have numeric identifiers such as serial numbers, the directory may specify the range of identifiers present in each segment. The directory may also specify whether certificate identifiers within the range but not actually present in the segment should be considered valid, invalid, or unknown. Thus, for example, if certificates 1 through 100 are all revoked, the directory could identify the range 1-100 as "present" in a segment that is actually empty, but with the "default" status set to "revoked." Long ranges where most certificates are valid (or most are revoked) can be efficiently represented by an entry in the directory and a short segment containing only the exceptional certificates' identifiers and information. Furthermore, when numeric ranges are used, it is easy to split a range into two or more sub-ranges if the segment corresponding to the range becomes too large to distribute conveniently.

The signed directory is seeded into a peer-to-peer data distribution network (340) and clients can obtain the directory (350) from the CA or from another client that has it already. Since the directory is signed, it can be validated separately by any client that receives it. When a client wishes to determine whether a certificate is still valid, it consults the directory to find a segment that contains information about the certificate (360) and then downloads that segment (370). The segment may be available from one of the participants in the peer-to-peer network, so the client may not have to contact the CA to obtain it. In fact, the more "popular" a segment is, the more peers are likely to have it, and the better the peer-to-peer network succeeds at spreading the burden of distributing certificate status information. Like the directory, the segments may be individually signed by the CA, so clients can validate them and use their contents without retrieving all of the segments. Once the segment has been downloaded, the client validates a certificate using the information in the segment (380).

Although FIGS. 2 and 3 showed the CRL segmenting operation being performed by the CA, in some embodiments, another participant in the environment may do this work. For example, an OCSP responder 150 or 155 could obtain the entire signed CRL directly from the CA, as occurs in prior art systems, and then prepare and distribute the segments and directory itself, according to the methods described in this application. In this case, the directory (and, in some embodiments, the segments) could be signed with the OCSP responder's private key, and verified with the corresponding public key.

Instead of using numeric ranges in the directory to inform clients which segment contains information about a certificate, an embodiment may use a hash of identifying information in the certificate, and provide the directory as a hash table relating hashed identifiers to segments that contain information about the identifiers' corresponding certificates. It might be convenient for a hash function used in this way to have more collisions than a normal function, since such collisions would merely indicate that status information about the colliding certificates was stored in a single segment. In some embodiments, a subset of hash bits could be used as the complete hash value to increase the number of collisions. For example, if only 12 bits of the hash value were used to indicate which segment contained status information about the certificate, then there would be a maximum of $2^{12}$ (4096) segments, and certificate information would be distributed fairly evenly among the segments.

Figure 4:
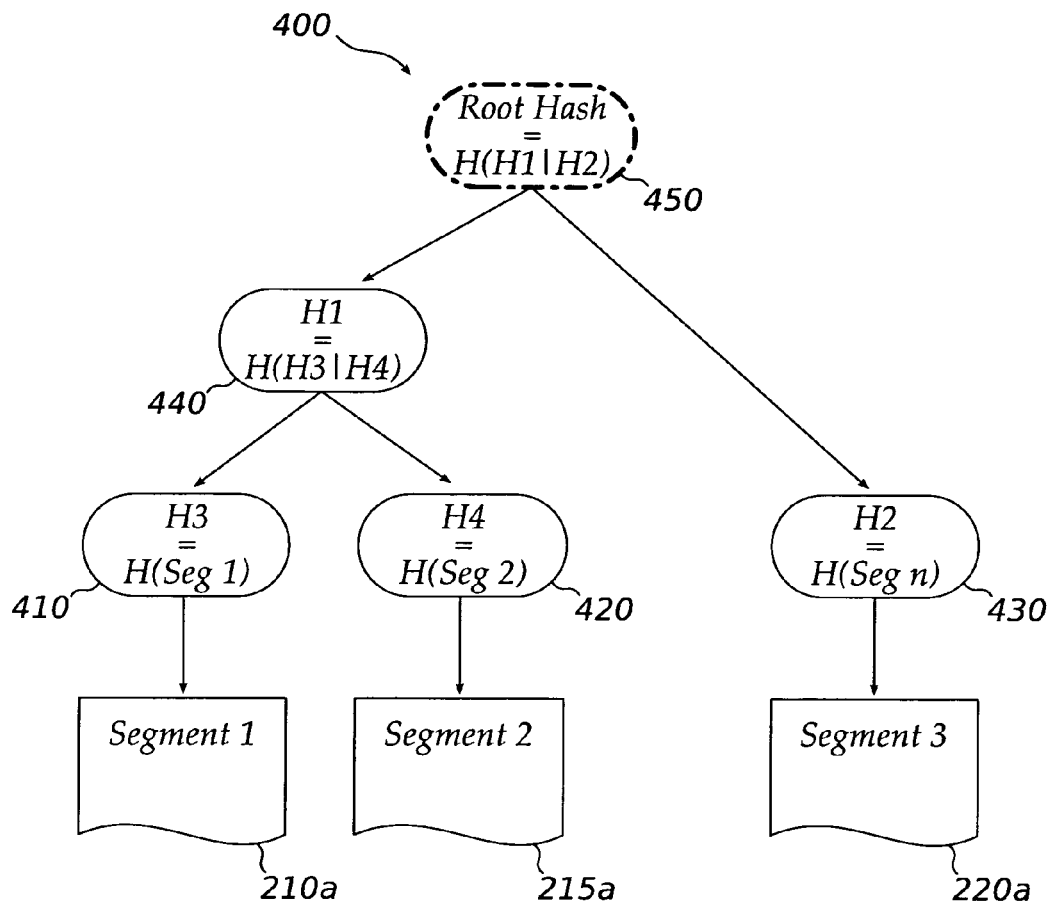
FIG. 4 illustrates a hash tree that can be used to help distribute security information securely in an insecure network environment.

Instead of (or in addition to) signing each segment containing certificate status data, the segments can be securely distributed through an insecure peer-to-peer network by using hash trees ("Merkle Trees"), as described by cryptographer Dr. Ralph Merkle in his 1979 doctoral dissertation at Stanford University. FIG. 4 shows a hash tree 400 representing information about segments 210*a*, 215*a* and 220*a*. (These may be the segments discussed in relation to FIG. 2, but they need not be cryptographically signed.) As described above, each segment contains certificate status information. Leaf nodes 410, 420 and 430 of the hash tree contain hash values computed over the contents of the corresponding segment. Internal node 440 contains a hash value computed over its child nodes. For example, internal node 440 may contain the hash of the concatenated hash values of its child nodes 410 and 420. Larger numbers of segments can be accommodated by allowing more child nodes per internal node, by having a greater number of internal nodes (and a deeper hash tree), etc. At each higher level of hash tree 400, nodes contain values that are related to the hashes of their child nodes. For example, the values may be hashes of concatenations of the children's hashes. Finally, root node 450 contains the uppermost hash value. If a client retrieves the top or root hash 450 from a trusted source, then it can verify any segment it retrieves by computing the hash of the segment and working up the tree, using internal node hashes obtained from any peer (trusted or untrusted) and comparing the final result against the trusted root hash 450. (With cryptographically secure hash functions, it is computationally infeasible for an attacker to create a modified segment and set of internal node hashes that can be combined to match the root hash. Therefore, a malicious peer cannot trick a target into using a modified segment by supplying correspondingly-altered internal hash node values—it is infeasible to compute such values.) Since the directory discussed in relation to FIGS. 2 and 3 is signed by the CA or other distributing entity, it can contain the root hash and still be safely distributed through a peer-to-peer network where participants do not necessarily trust each other.

Figure 5:
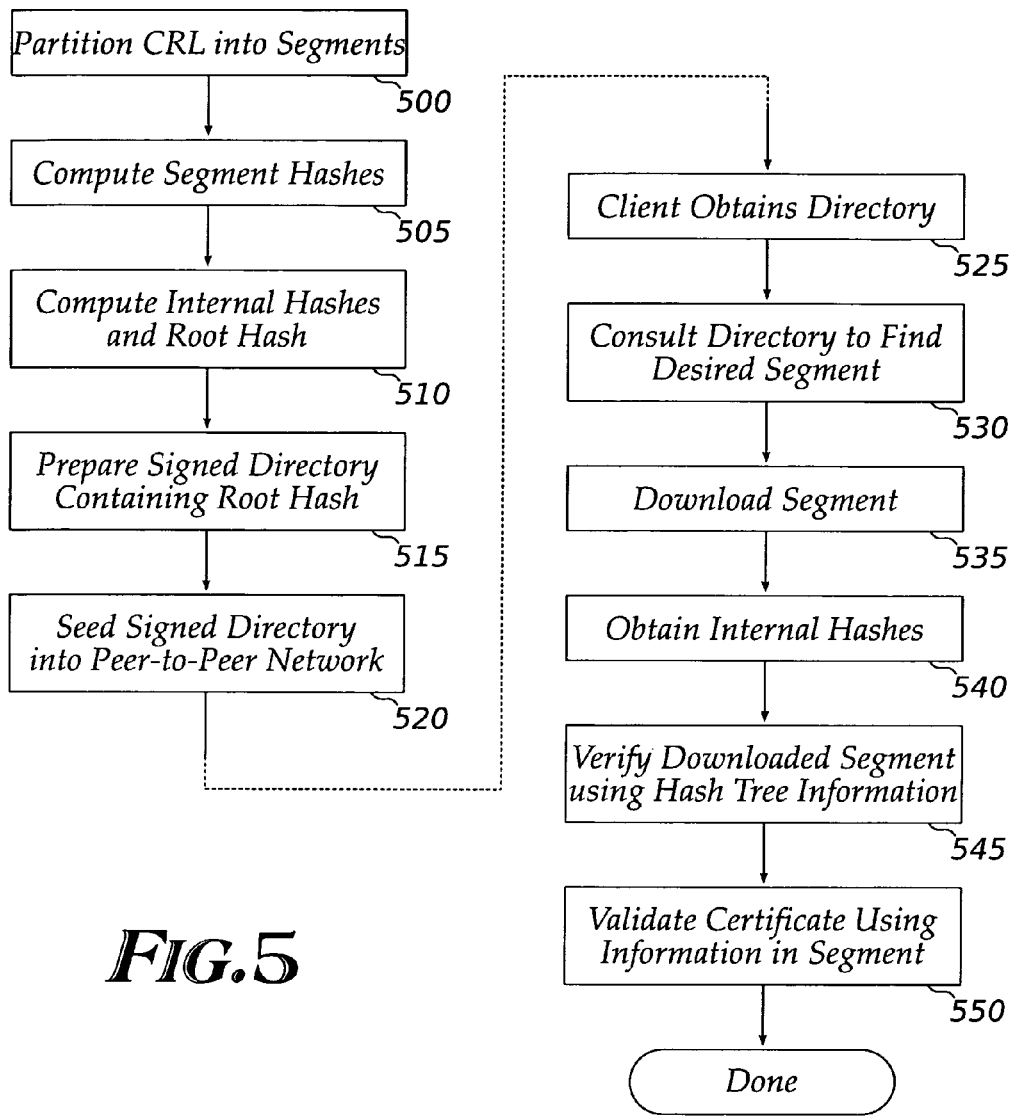
FIG. 5 is a flow chart outlining an alternate method of securely transmitting CRL and CRL-like data through an insecure peer-to-peer network.

FIG. 5 shows how the method of FIG. 3 could be modified to incorporate a hash tree. This embodiment reduces the number of cryptographic signatures the Certificate Authority makes. As before, the CRL information is partitioned into segments (500). Segments may contain only information about revoked certificates, or information about all certificates (both valid and revoked). Hash values for each segment are computed (505). These hash values are the leaf values of the hash tree. Next, hash values for the internal nodes of the hash tree are computed, up to and including the root hash value (510). An internal node hash may be the hash of the concatenation of the hash values of its child nodes. A cryptographically signed directory containing the previously-computed root hash is prepared (515). The directory contains information to correlate a certificate identifier with the segment(s) that contain information about that certificate. The signed directory is seeded into a peer-to-peer data distribution network (520).

Later, when a client wishes to validate a certificate, it obtains the directory (525) and consults the directory to find the segment that contains information about the certificate (530). The segment is downloaded from a participant in the peer-to-peer network (535) (perhaps from the CA itself, or from another participant that has obtained the segment). In this embodiment, the segment need not be cryptographically signed. The client obtains the internal hash values of the nodes of the hash tree (540). These values may be distributed in the directory, or copies may be included with each segment. Alternatively, they may be distributed separately as an "extra" segment. It is not necessary that the hash values be encrypted or cryptographically signed.

The client verifies the downloaded segment using the hash tree information it has obtained (545), and finally validates the certificate using information in the segment (550). Of course, if the client detects tampering at any stage (e.g. a cryptographic signature is invalid or a hash value does not match the expected value) the client initiates error processing. This may entail downloading new copies of the directory, segment, or other information (perhaps a data transmission error occurred), or notifying a user or administrator that security information appears to have been tampered with.

Distributing CRLs (and CRL-like certificate status information) through a peer-to-peer data distribution network as described above is one way of reducing the CA's burden. However, the directory and segments may still be relatively large data objects, and inconvenient for an end user who only needs to validate a small number of signatures or certificates. The Online Certificate Status Protocol ("OCSP") described in RFC 2560 was designed in part to address the certificate validation needs of end users. OCSP can be understood broadly as a protocol wherein a client sends an identifier of a certificate it wishes to investigate to an OCSP server, and the OCSP server returns a response including the status of the requested certificate (and possibly status information for other certificates). The OCSP response is signed with a private key and validated with a corresponding public key, where the public key is one that the client has also verified as belonging to an entity it trusts to provide certificate status information.

OCSP servers are responsible for obtaining up-to-date CRL information upon which to base their responses. The peer-to-peer CRL distribution mechanism described above may be useful in accomplishing this task. However, preparing OCSP responses (and particularly the cryptographic signing of responses) is a computationally expensive undertaking. RFC 2560 discusses preparing (and pre-signing) responses as a method of reducing OCSP server load, but pre-signed responses have a built-in expiration time after which they are no longer useful. (The expiration time, "nextUpdate", is usually correlated with the CA's CRL update period.)

Figure 6:
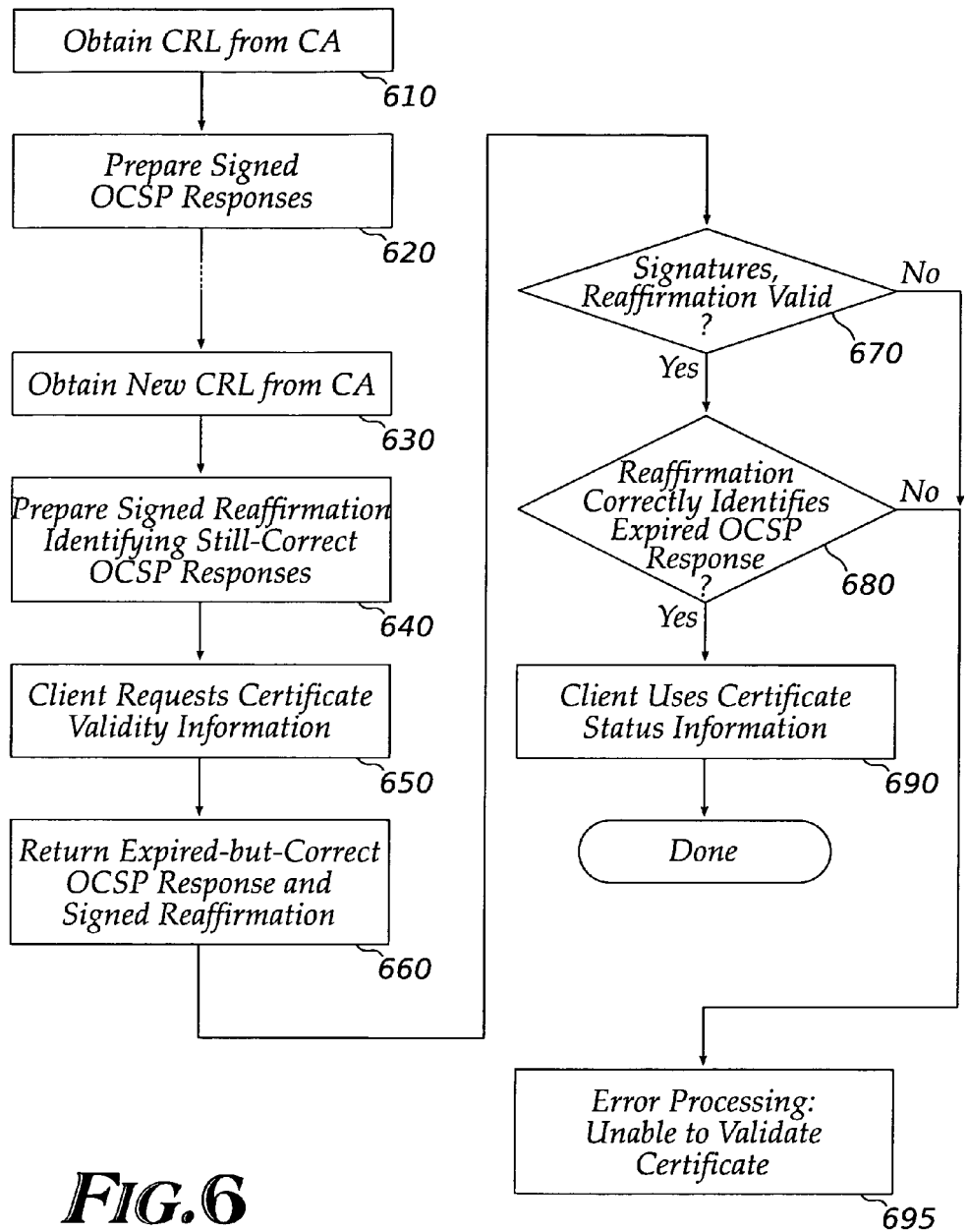
FIG. 6 is a flow chart outlining operations of another embodiment of the invention.

An embodiment of the invention can extend the usefulness of pre-signed responses (thus reducing the number of times that new responses need to be prepared) by following the method outlined in FIG. 6. First, a CRL is obtained from the CA (610), perhaps through a peer-to-peer data distribution network as described earlier. Signed OCSP responses are prepared (620). These responses may include a "nextUpdate" field indicating the time when new CRL information is expected to become available. OCSP responses may be prepared all at once or prepared when a request arrives and cached in case another request for the same certificate occurs.

Later, a new (updated) CRL is obtained from the CA (630). Some new certificates may have been revoked, but previously-revoked certificates will still be revoked, and most valid certificates will still be valid. Thus, many of the previously-prepared OCSP responses will still contain correct information, although the "nextUpdate" field will mark them as having expired. Rather than discard all of these expired-but-still-correct OCSP responses, the OCSP server can prepare a signed reaffirmation data structure (640) containing information to identify the OCSP responses. For example, a reaffirmation structure may contain a hash of the expired OCSP response. Then, if a client requests information about a certificate that is described in an expired OCSP response (650), the OCSP server returns the expired response and the signed reaffirmation data structure (660). The client verifies the signatures on the expired response and reaffirmation (670), checks to see that the reaffirmation correctly identifies the expired response (680), and uses the information in the response (690) as if it was still valid. If any signature cannot be verified, or if the reaffirmation cannot be connected with the expired response, the client performs appropriate error processing (695) to deal with its (possibly temporary) inability to validate a certificate or signature.

In the foregoing description, note that a reaffirmation data structure may contain hash values or other information to identify several expired, pre-signed OCSP responses, or other expired, pre-signed reaffirmations. The same reaffirmation may be sent with many different responses. Thus, instead of preparing and signing many new OCSP responses and/or reaffirmations, the OCSP server can prepare and sign a single reaffirmation that "revitalizes" or extends the expiration time of the responses or reaffirmations. This reduces the computational load on the OCSP server and may permit it to serve more clients. Reaffirmations may also incorporate an expiration time to prevent replay attacks where an adversary records an expired OCSP response and a reaffirmation that extends the OCSP response expiration, then replays the response and reaffirmation to trick a target into believing that a certificate is still valid.

It is appreciated that, because the OCSP responses and reaffirmations are signed, they can be verified by clients who receive them from untrusted sources. Therefore, OCSP responses (both current and expired), and OCSP reaffirmations, can be cached and transmitted from untrusted intermediaries to further reduce the load on the OCSP servers.

At several points in the foregoing material, it has been mentioned that status information for one certificate may be aggregated with information for other certificates. For example, the CRL or CRL-like segments a CA distributes through a peer-to-peer network, and the OCSP responses provided by an OCSP server, can contain status information about a number of certificates. The certificates described in a segment or OCSP response may be numerically related (e.g. part of the same numerical range) or may have similar hash values (e.g. a predetermined subset of hash bits, such as the low-order sixteen bits, may be equal). However, the certificates described in an aggregation of statuses can also be carefully selected based on auxiliary data to further improve distribution efficiency. (As used herein, "auxiliary data" refers to information about the users and historical uses of certificates, the operation of systems besides the OCSP server, and other data not directly related to or contained in the certificate itself. The selection of certificates about which status information is to be aggregated is the subject of co-pending patent application Ser. No. 11/607,215, now U.S. Pat. No. 7,814,315, and Ser. No. 11/897,759.

FIG. 7 shows some components and subsystems of a computer system that can implement some of the methods of embodiments of the invention. One or more programmable processors ("central processing units" or "CPUs") 710 execute instructions contained in memory 720 to perform methods according to an embodiment. Memory 720 may also contain data upon which the instructions operate. For example, messages, certificates, public and private keys, and certificate status information may be held in memory 720 at various times. A network interface 730 permits the system to communicate with its peers and exchange data as described above. Some systems may include a cryptographic accelerator 740, which speeds the complex and computationally-expensive calculations involved in many public key systems. A mass storage interface 750 permits the system to store and retrieve information on a computer-readable medium 760. System bus 770 connects these components and carries control signals and data between them.

An embodiment of the invention may be a machine-readable medium having stored thereon instructions to cause a programmable processor to perform operations as described above. In other embodiments, the operations might be performed by specific hardware components that contain hard-wired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The applications of the present invention have been described largely by reference to specific examples and in terms of particular allocations of functionality to certain hardware and/or software components. However, those of skill in the art will recognize that loadable module verification can also be achieved by software and hardware that distribute the functions of embodiments of this invention differently than herein described. Such variations and implementations are understood to be captured according to the following claims.

We claim:

1. A method comprising:
  dividing, by a computer system, a certificate revocation list (CRL) into a plurality of data objects, each data object to contain a security certificate status for at least one security certificate;
  preparing, by the computer system, a signed directory of the plurality of data objects, the signed directory specifying the plurality of data objects and identifiers of security certificates covered by each of the plurality of data objects, the signed directory not including security certificate statuses for security certificates associated with the CRL and being a separate data structure distributable independently from the plurality of data objects containing the security certificate statuses for the security certificates associated with the CRL; and
  distributing, by the computer system, the signed directory to a client in a peer-to-peer data distribution network.

2. The method of claim 1 wherein the client is a first client, the method further comprising:
  distributing one of the plurality of data objects to a second client in the peer-to-peer data distribution network, wherein the second client is to transmit the one of the plurality of data objects to a third client.

3. The method of claim 1 wherein each of the plurality of data objects is signed with a private key of a certificate authority ("CA") that issued the at least one security certificate whose status is contained in the data object.

4. The method of claim 1 wherein the signed directory provides ranges of numeric identifiers of the at least one security certificate in each data object.

5. The method of claim 1 wherein the signed directory provides a subset of hash bits of the at least one security certificate in each data object.

6. The method of claim 1 wherein the signed directory includes a root hash of a hash tree, where leaves of the hash tree are hash values of the plurality of data objects.

7. A method comprising:
   preparing, by an online certificate status protocol (OCSP) server, a signed certificate status object containing a validity status of a security certificate, the certificate status object to have an expiration time;
   preparing, by the OCSP server, a signed reaffirmation containing an identifier of the signed certificate status object, the signed reaffirmation extending the expiration time of the certificate status object, the signed reaffirmation not including the validity status of the security certificate and being a separate data structure distributable independently from the signed certificate status object containing the validity status of the security certificate; and
   transmitting, by the OCSP server, the signed certificate status object and the signed reaffirmation to a client in response to a request for the validity status of the security certificate, wherein the transmitting operation occurs after the expiration time.

8. The method of claim 7 wherein the signed certificate status object contains a validity status of a plurality of security certificates.

9. The method of claim 8 wherein the plurality of security certificates are selected according to auxiliary data.

10. The method of claim 7 wherein the signed reaffirmation contains an expiration time.

11. The method of claim 7 wherein the signed reaffirmation object contains hashes of a plurality of signed certificate status objects.

12. The method of claim 7 wherein the identifier of the signed certificate status object is a hash of the certificate status object.

13. A non-transitory computer-readable storage medium containing executable instructions to cause a programmable processor to perform operations comprising:
   dividing, by a computer system, a certificate revocation list (CRL) into a plurality of data objects, each data object to contain a security certificate status for at least one security certificate;
   preparing, by the computer system, a signed directory of the plurality of data objects, the signed directory specifying the plurality of data objects of the CRL and identifiers of security certificates covered by each of the plurality of data objects, the signed directory not including security certificate statuses for security certificates associated with the CRL and being a separate data structure distributable independently from the plurality of data objects containing the security certificate statuses for the security certificates associated with the CRL; and
   distributing the cryptographically-signed directory and plurality of segments via a peer-to-peer data distribution network.

14. The non-transitory computer-readable storage medium of claim 13, containing additional instructions to cause the programmable processor to perform operations comprising:
   computing hash values of nodes of a hash tree, wherein values of leaves of the hash tree are hash values of the plurality of segments; and
   incorporating a root hash value of the hash tree into the cryptographically-signed directory.

15. The non-transitory computer-readable storage medium of claim 14 wherein each segment of the plurality of segments contains the hash values of nodes of the hash tree.

16. The non-transitory computer-readable storage medium of claim 13, containing additional instructions to cause the programmable processor to perform operations comprising:
   computing a cryptographic signature of each segment of the plurality of segments.

17. A non-transitory computer-readable storage medium containing executable instructions to cause a programmable processor to perform operations comprising:
   preparing a cryptographically-signed reaffirmation data structure containing an identifier of an Online Certificate Status Protocol ("OCSP") response having an expiration time, the cryptographically-signed reaffirmation data structure extending the expiration time of the OCSP response, the signed reaffirmation data structure not including the OCSP response and being a separate data structure distributable independently from the OCSP response; and
   transmitting the cryptographically-signed reaffirmation data structure to an OCSP client with the OCSP response, wherein
   the transmitting operation occurs after the expiration time contained in the OCSP response.

18. The non-transitory computer-readable storage medium of claim 17 wherein the identifier of the OCSP response is a cryptographic hash of identifying material of the OCSP response.

19. The non-transitory computer-readable storage medium of claim 17 wherein the cryptographically-signed reaffirmation data structure contains identifiers of a plurality of OCSP responses.

20. The non-transitory computer-readable storage medium of claim 17 wherein the cryptographically-signed reaffirmation data structure contains the expiration time, said expiration time to coincide with an expected availability of an updated Certificate Revocation List ("CRL").

21. A system comprising:
   a certificate authority ("CA") to maintain a database of certified public keys, the database to include a revocation status of each of the certified public keys; and
   a plurality of Online Certificate Status Protocol ("OCSP") servers to receive Certificate Revocation List ("CRL") data containing revocation statuses of certified public keys from the CA and respond to OCSP queries from a client with an expired OCSP reply accompanied by a cryptographically-signed reaffirmation data object that identifies the expired OCSP reply and extends an expiration time of the OCSP reply, the signed reaffirmation data object not including the revocation statuses of the certified public keys and being a separate data structure distributable independently from the CRL data containing the revocation statuses of the certified public keys;
   wherein the OCSP servers are to distribute the CRL data among themselves as a peer-to-peer data distribution network.

* * * * *